BEST AVAILABLE COPY
H. Brockway.
Knitting Machine Take-up.
No. 2,397. Reissued Nov. 20, 1866.
Fig. 1.
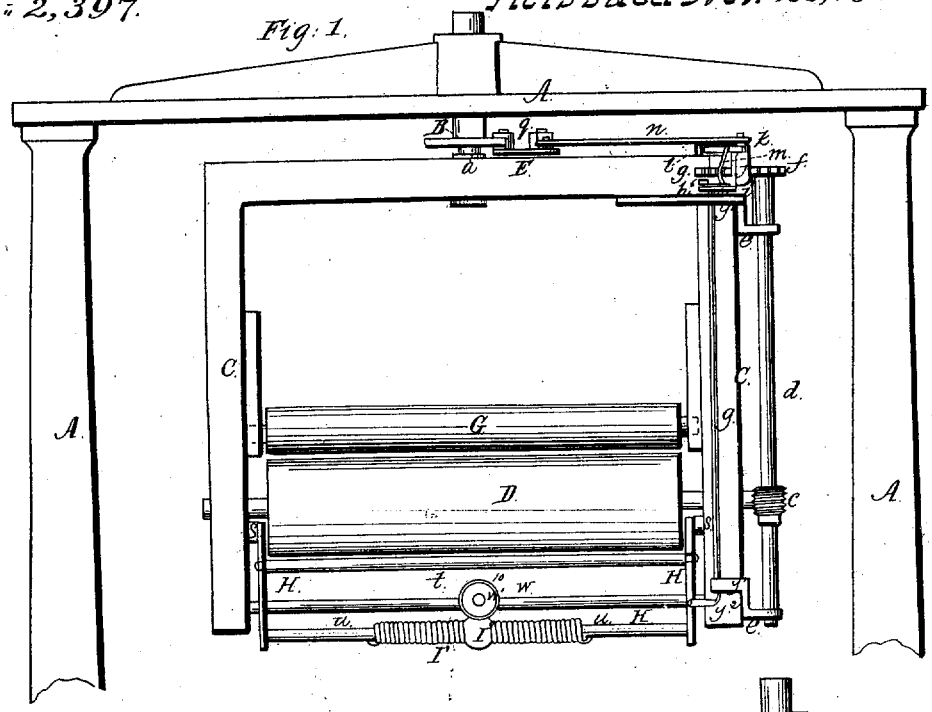
Fig. 3.
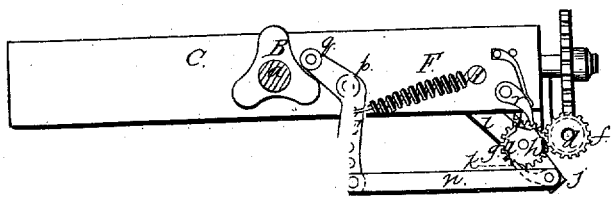
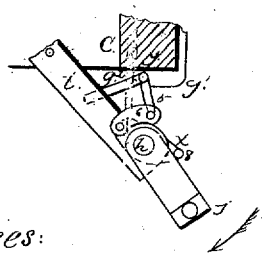
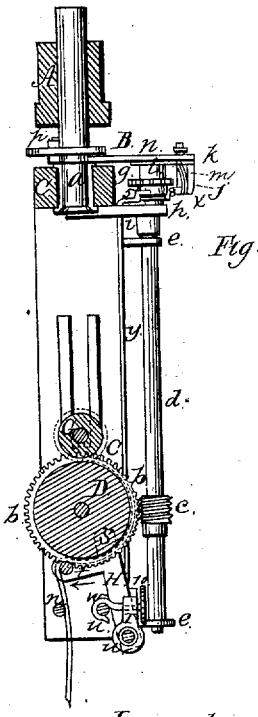
Fig. 2.
Witnesses:
F. W. Wurster
Chas. H. Leonard
Inventor.
Henry Brockway
by his Attorney
C. S. Renwick
N. PETERS, PHOTO-LITHOGRAPHER, WASHINGTON, D. C.

UNITED STATES PATENT OFFICE.

CLARK TOMPKINS, OF TROY, NEW YORK, ASSIGNEE OF HENRY BROCKWAY.

IMPROVEMENT IN TAKE-UP FOR CIRCULAR-KNITTING MACHINES.

Specification forming part of Letters Patent No. 44,932, dated November 8, 1864; reissue No. 2,397, dated November 20, 1866.

*To all whom it may concern:*

Be it known that I, HENRY BROCKWAY, of Cohoes, in the county of Albany and State of New York, have invented a new and useful Improvement in the Take-Up of Circular-Knitting Machines; and I do hereby declare that the following is a full, clear, and exact description thereof, which will enable others skilled in the art to make and use the same, reference being had to the accompanying drawings, forming part of this specification, in which—

Figure 1 is a front view of a take-up. Fig. 2 is a vertical section of the same, at right angles to Fig. 1. Fig. 3 is a plan of the same; and Fig. 4 is a horizontal section of some of the working parts of the same, on a larger scale than Figs. 1, 2, and 3.

Similar letters and numbers of reference indicate like parts.

This invention consists in certain novel means of effecting the operation of the take-up roll of a knitting-machine, and of controlling such operation by the tension of the web.

A is the frame, which supports the stationary upright central stud *a*, by which the take-up mechanism is suspended, and about which it rotates. This stud is situated in line with the axis of rotation of the cylinder of the knitting-machine, and has fast upon it the stationary cam B, by which the operation of the take-up is effected. C is the rotating frame of the take-up mechanism, having in its upper part a central hole, which is bushed to receive the stud *a*. D is the rough-surfaced take-up roll, by which the knitted web is drawn up from the machine, having its journals fitted to bearings in the sides of the frame C, and having fast on one end, outside of the said frame, a worm-wheel, *b*, which gears with an endless screw, *c*, on the lower part of an upright shaft, *d*, which works in bearings *e e*, attached to the frame C. On the upper part of this shaft there is secured a spur-gear, *f*, which gears with a spur-gear, *g*, which works loosely on an upright stud, *h*, which is secured in a bracket or arm, *i*, attached rigidly to the frame. On this stud there is also fitted a pawl-lever, *j*, which carries a pawl, *k*, which engages with a ratchet-wheel, *l*, which is secured to the spur-gear *g*, the said lever vibrating upon the said stud as a fulcrum, and the pawl being held to the ratchet-wheel by means of a spring, *m*. The said lever is connected by a rod, *n*, with one end of a lever, E, which works horizontally on a fixed fulcrum-pin, *p*, secured in the top of the frame, and the other end of the said lever has attached to it an anti-friction wheel, *q*, arranged to work on the periphery of the cam B. A spring, F, is so applied to the said lever as to keep the wheel *q* in contact with the cam when it is not held back therefrom by the means hereinafter to be described. In the rotation of the frame C about the stud *a*, (which accompanies the rotation of the needle-plate or needle-cylinder,) the lever E is caused to oscillate by the action of the cam B and spring F, the former giving it what may be termed its direct movement, and the latter causing it to return or retrograde upon its fulcrum-pin *p*. As the cam-lever E is connected with the pawl-lever *j* and pawl *k*, they are caused to move in a similar manner, and to turn the ratchet-wheel *l* and the gear *g*. The gear *g* gives motion to the gear *f*, and through it to the shaft *d*, and the endless screw on the said shaft gives motion to the worm-gear *b*, and throught it to the take-up roll D, which draws up the web and winds it upon the roll G. In this operation the ratchet-wheel *l* is prevented from turning back and the take-up retained by means of a stop-pawl, *r*, applied to the said wheel.

The above-described operation of taking up is not, however, intended to be continuous, but only to continue while the web is slack between the knitting-needles and the roll D, or while the tension thereon does not exceed a certain desirable degree; and I will now proceed to describe the means by which the tension is made to control the operation of the taking-up mechanism.

H is a vibrating frame attached by opposite pins *s s* to opposite sides of the frame C, and having arranged within it a bar, *t*, which may be called the variable instrument. This bar is parallel with the roll D, and the web passes over it to the roll D, as shown in Fig. 2, where the web is represented in red color. This frame has attached to its lower rail *u* a strong spring, I, which is connected with a vibrating arm, I′, which is fitted loosely to the said rail, and to which there is attached a hook, $w'$, which hooks onto one of the lower rails $w\,w$ of the take-up frame C. This spring, by its action on the frame H, draws the bar $t$ in the direction indicated by the arrow in Fig. 2, which is the opposite direction to that in which the tension of the cloth tends to draw it, and while the tension of the cloth is not too great, the said spring holds back the frame H in contact with the rail $w$, before mentioned. On the same side of the frame B on which the shaft $d$ is arranged there is placed, near the said shaft, a small upright rod or shaft, $y$, which is fitted to rock in suitable bearings $y^1$, secured to the side frame. The lower end of this shaft is bent to form an arm, $y^2$, which is long enough to bear against one side of the vibrating frame H, and the upper end is made or furnished with a crank, 5, the wrist of which is connected by a link, 6, with one end of a short lever, $x$, which is fitted loosely to the stud $h$, just below the pawl-lever $j$, and the other end of which is turned up to form a stop behind one edge of the pawl-lever, as shown at 8 in Figs. 2 and 4.

In an apparatus constructed as above described, the bar $t$ is acted upon by two antagonistic forces, which are the strain of the spring I, which tends to move the bar in the direction indicated by the arrow in Fig. 2, and the strain exerted by the knitted fabric, which tends to move it in the opposite direction to that indicated by the arrow; and as the bar is connected with a vibratable frame, its position varies according as one or the other force predominates. When the knitting of the fabric by the needles does not proceed as fast as the taking up of the fabric by the turning of the take-up roll D, the strain of the fabric upon the bar preponderates over the force of the spring I, and the bar $t$ is moved in a direction the reverse of that indicated by the arrow in Fig. 2. Such movement causes the frame H to vibrate, and to move the lever $x$ through the rock-shaft $y$, thereby advancing the stop 8, and causing it to stop the retrograde movement which the pawl-lever and the pawl $k$ tend to make (after each vibration of the cam-lever E and pawl-lever $j$ by a protuberance of the cam B) for the purpose of shifting the pawl to a succeeding tooth of the ratchet-wheel. As the pawl, pawl-lever, and cam-lever are thus held back or stopped from effecting their retrograde movements, the turning of the take-up roll by the forward movement imparted to the pawl, pawl-lever, and cam-lever by the protuberances of the cam, and the consequent turning of the take-up roll D, stop, and the stoppage of the take-up mechanism continues until the strain upon the fabric is relaxed by the progression of the knitting, whereupon the force of the spring I preponderates over the strain exerted by the fabric; consequently the bar $t$ is moved in the direction indicated by the arrow in Fig. 2, the stop 8 behind the pawl-lever is moved backward, and the pawl, pawl-lever, and the cam-lever are permitted to retrograde under the action of the spring F, so that the pawl engages with a succeeding tooth of the ratchet-wheel, the wheel of the cam-lever approaches the axis of the cam, so as to be operated by the next succeeding protuberance thereof, the ratchet-wheel is moved, the take-up roller turned, and the taking up of the fabric is resumed. The bar $t$ is thus a variable instrument, whose position is controlled by the strain upon the fabric, and which is combined with the pawl-lever by means of the stop 8, so that the variable instrument controls the action of the pawl, thereby stopping the take-up mechanism or permitting its action, according to the strain upon the fabric.

In order to provide for a less or more rapid take-up, and a closer or more open web, the hook $w'$ is attached to the arm I′, before mentioned, by means of a screw-thread on its stem, which passes through a hole in the said arm, and by a nut, 10, screwed onto the said thread outside of the said arm. By screwing up the said nut the tension of the spring is increased, and by that means the take-up is made more rapid, and by unscrewing the said nut an opposite effect is produced.

What I claim as my invention, and desire to secure by Letters Patent, is—

1. The combination, in the take-up mechanism of a knitting-machine, of the following instrumentalities, viz: a stationary cam, revolving frame of the take-up mechanism, take-up roll, cam-lever, ratchet-wheel, and vibrating pawl, stop for preventing the pawl from vibrating, and variable instrument for operating the stop, all operating in the combination substantially as set forth.

2. The combination, in the take-up mechanism of a knitting-machine, of the following instrumentalities, viz: the revolving frame of the take-up mechanism, take-up roller, cam, ratchet-wheel and pawl, endless screw and worm-wheel, and variable instrument for controlling the action of the pawl, all operating in the combination substantially as set forth.

HENRY BROCKWAY. [L. S.]

Witnesses:

ALBERT TOMPKINS,
SAML. W. LOVEJOY.